United States Patent

Johnston et al.

[11] 4,111,501
[45] Sep. 5, 1978

[54] BEARING CAGE

[75] Inventors: Gordon Boyd Johnston, Beesd, Netherlands; Hasse Eivind Strandberg, Floda, Sweden

[73] Assignee: SKF Industrial Trading & Development Co., B.V., Nieuwegein, Netherlands

[21] Appl. No.: 853,506

[22] Filed: Nov. 21, 1977

Related U.S. Application Data

[60] Division of Ser. No. 759,036, Jan. 13, 1977, abandoned, which is a continuation of Ser. No. 545,893, Jan. 31, 1975, Pat. No. 4,004,840.

[30] Foreign Application Priority Data

Feb. 6, 1974 [NL] Netherlands .................. 7401604

[51] Int. Cl.² ............................................ F16C 33/46
[52] U.S. Cl. .................................................. 308/201
[58] Field of Search ............... 308/201, 235, 217, 191, 308/235, 199; 29/148.4 C

[56] References Cited

U.S. PATENT DOCUMENTS

| 1,168,937 | 1/1916 | Eitner | 308/201 |
| 2,146,440 | 2/1939 | Pew | 308/201 |
| 3,758,180 | 9/1973 | Asberg | 308/201 |

Primary Examiner—Trygve M. Blix
Assistant Examiner—Douglas C. Butler
Attorney, Agent, or Firm—Daniel M. Rosen

[57] ABSTRACT

Cage for a bearing which is only axially insertable from one side of a bearing which comprises inner race and outer race rings both provided with an integral flange and rows of rolling elements running in race ways between the rings, each two adjacent rolling elements out of two rows in circumferential direction of the bearing being separated in relation to the next pairs of rolling elements by a bearing cage member, characterized in that the bearing cage-partition member has such a shape that it is elastically compressible at least in radial direction, such that the rolling elements during loading of the bearing both in the same as well as in the adjacent race way can take relatively small distance differences in relation to each other.

3 Claims, 4 Drawing Figures

BEARING CAGE

This application is a division of application Ser. No. 759,036 filed Jan. 13, 1977 now abandoned, which is a continuation of application Ser. No. 545,893 filed Jan. 31, 1975, now U.S. Pat. No. 4,004,840.

The invention relates to a bearing cage which is only axially insertable from one side of a bearing which comprises an inner race ring and an outer race ring both provided with an integral flange and rows of rolling elements running in race ways between said rings, each two adjacent rolling elements out of two rows in circumferential direction of the bearing being separated in relation to the next pairs of rolling elements by a bearing cage member.

A bearing cage of this type is known for example from the U.S. Pat. No. 3,758,180. This patent discloses a bearing cage of the so-called "snap"-type provided with an annular side member with axially partitions projecting from said member. These partitions are generally parallel to each other and separate pairs of rolling elements. Such a bearing cage is also applied in a bearing comprising rings which are integrally provided with flanges. These type of bearings are especially used in the transportation techniques mainly as wheel bearings in automobiles.

The invention now introduces a bearing cage for the said type bearing which exposed to high loads and suddenly changing bending moments still functions in a reliable way. To that end the bearing cage-partition member has such a shape that it is elastically compressible in radial direction such that the rolling elements during loading of the bearing both in the same as well as in the adjacent race way can take relatively small distance difference in relation to each other.

According to a preferred embodiment of a bearing cage of the aforementioned type which cage comprises an annular member with partitions projecting therefrom into snapfingers for accomodating rolling elements, said cage is characterized in that a partition is provided with one or more recesses. By means of these measures a bearing cage according to the invention can easily and flexible adapt itself under different load conditions such as changing in rotational speeds of the rolling elements in the rows due to the high and suddenly changing bending moments which can be generated in such wheel hub bearings.

The invention will further be described in connection with the drawing by which advantages and other features of the invention will appear.

Figure 1:
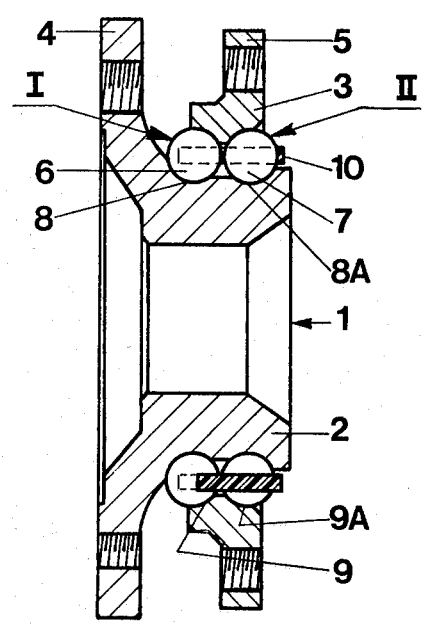
FIG. 1 is a cross sectional view of a bearing provided with a cage according to the invention.

According to FIG. 1 the bearing comprises an inner race ring 2 and an outer race ring 3, both rings being provided with an integral flange 4, 5 respectively, to which for example the hub of a wheel or a part of a brake system of a vehicle can be fastened. The bearing further comprises two rows (I,II) of rolling elements consisting of balls 6,7 resp. mounted on running surfaces 8, 8A; 9, 9A resp. of the inner race ring 2 and outer race ring 3 resp. The rolling elements being separated on specified distances from one another in the direction of rotation by a bearing cage 10. The insertion of the rolling elements or balls 6 and 7 in such bearings is effected by displacing one of the bearing rings eccentrically with regard to the other, thereby providing a sickel-shaped gap, permitting the insertion of a certain number of balls between the inner and outer ring. Thereafter the rings are centered, and the balls distributed around the running faces by inserting the bearing cage 10 axially between the balls. In this embodiment the balls 6 and 7 are separated in pairs (see FIGS. 2,3 and 4), each pair being separated from the following pair of balls in rows I and II by means of partitions 11. It is preferable to apply a snap-type bearing cage, the mountin of such bearing cage requiring some effort for fixing the snap-fingers 12 over the rolling elements or balls.

It will be evident that the bearing as shown in FIG. 1 will be exposed — at least during operation — to considerably changing loads and bending moments, which often are of a different origin than those affecting conventional roller bearings, and which involve the risk that the balls in one of the rows will rotate at a higher rate than those in the other row. In that case relative high frictional forces arise which could cause the expelling of the cage out of the bearing.

Figure 2:
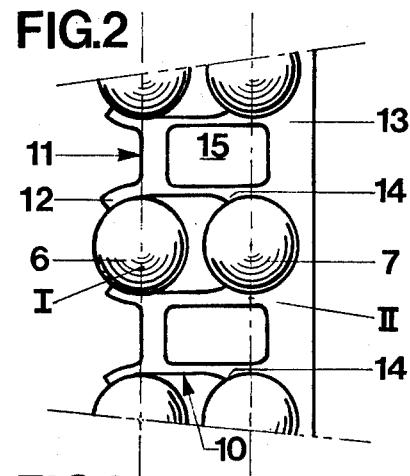
FIGS. 2–4 represent the views of a part of bearing cages which can be applied in a bearing according to FIG. 1.

FIG. 2 (as well as the FIGS. 3 and 4) shows a part of a bearing cage according to the invention made of an amide or acetate or similar stable synthetic material. The embodiment comprises an annular member 13 with partitions 11 projecting from it wth at the end of each partition two diverging parts or snapfingers 12. The snap fingers 12 form converging pairs to party fit around balls 6 of row I, while the balls 7 of row II are partly enclosed by small projections 14. This preferably embodiment comprises a partition II which is provided with an essentially rectangular recess or notch 15 which preferably is arranged between the vertical planes through rows I and II, By this arrangement a very flexible partition between pairs of rolling elements is achieved, which means that differences in distance appearing between the rolling elements during loading of the bearing can be easily followed by the bearing cage, so that expelling of the cage from the bearing is prevented.

Figure 3:
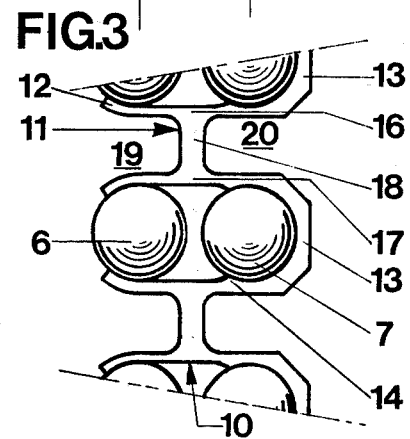

FIG. 3 shows a bearing cage according to the invention where by the partition-member 11 substantially consists of strip-like elements 16 and 17 projecting from the annular member 13 and forming a U-shaped pocket to partly fit around the rolling elements 6 and 7. The elements 16 and 17 or the adjacent pockets being mutually connected by a connecting member 18, or in reversed sense; the cage 10 made of a synthetic material comprises a partition member 11 provided with rectangular recesses or notches (19 and 20) which are placed on both sides or the middle (18) of the partitions (11) having an open end-part to the annular member (13) and the snap-fingers (12) respectively. By this in addition to the resilient or flexible adaption of the bearing cage to the mutual changing positions of the rolling elements also a "hinge action" is introduced between cage parts 16, 17 comprising pairs of rolling elements 6, 7 so that an optimal adaption of the bearing cage 10 to different load conditions of this type of bearing has been achieved.

Figure 4:
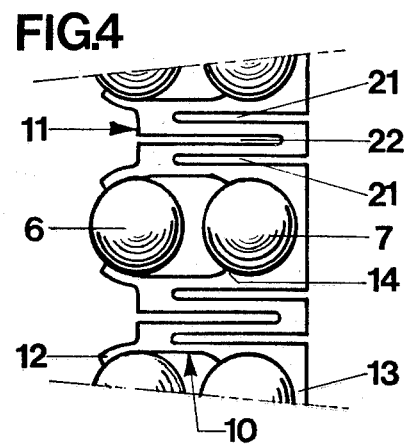

FIG. 4 shows a part of a bearing cage according to the invention wherein the partition 11 is provided with slot- or groove-like notches 21 and 22 extending on relative great distances in axial direction of the bearing. By this a bearing cage with an elastic partition member 11 is obtained which in view of the production is very interesting, in other words; this cage can easily be produced in great quantities without loosing the advantages as described.

It is observed that a bearing cage according to the invention can be made of different materials, for example a reinforced material or a combination of a synthetic material and a metal or glass fibre reinforced synthetic material.

We claim:

1. In a bearing having an inner race ring and an outer race ring about a common central axis, two circular rows of rolling elements positioned to roll between said rings in raceways in said rings, said two rows defining first and second planes axially spaced along said axis, and a bearing cage insertable axially from one side of said bearing, said cage including holding means for positioning each rolling element of one row adjacent one rolling element of the second row as an axially aligned pair, and for positioning said pairs circumferentially around said raceways, the improvement in combination therewith, wherein said bearing cage comprises an annular, unitary member of a flexible and elastic material having circumferentially spaced U-shaped pockets, each with an axially extending recess which is closed at one end and open at the other end, and a partition between and connecting each two adjacent pockets, and extending from the open end of each pocket a pair of snap-fingers extending generally axially and partially converging, each pocket and associated snap-fingers forming one of said holding means for one of said pairs of rolling elements, each pocket holding a first rolling element of each pair axially fixed in the closet end of the U-shape thereof, with the second rolling element of said pair axially movable in said recess relative to said first rolling element, and said snap-fingers of said pocket defining a limit of axial movement of said second rolling element only in the direction away from the first rolling element, each of said partitions comprising axially spaced first and second parts generally near said first and second planes with an aperture defined between said parts and adjacent pockets, whereby said cage is elastically deformable in the radial direction and said rolling elements in each of said pairs, as well as rolling elements in adjacent rows, may move relative to each other.

2. In a bearing having an inner race ring and an outer race ring about a common central axis, two circular rows of rolling elements positioned to roll between said rings in raceways in said rings, said two rows defining first and second planes axially spaced along said axis and a bearing cage insertable axially from one side of said bearing, said cage including holding means for positioning each rolling element of one row adjacent one rolling element of the second row as an axially aligned pair, and for positioning said pairs circumferentially around said raceways, the improvement in combination therewith, wherein said bearing cage comprises an annular, unitary member of a flexible and elastic material having circumferentially spaced U-shaped pockets, each with an axially extending recess which is closed at one end and open at the other end, and a partition between and connecting each two adjacent pockets, and extending from the open end of each pocket a pair of snap-fingers extending generally axially and partially converging, each pocket and associated snap-fingers forming one of said holding means for one of said pairs of rolling elements, each pocket holding a first rolling element of each pair axially fixed in the closed end of the U-shape thereof, with the second rolling element of said pair axially movable in said recess relative to said first rolling element, and said snap-fingers of said pocket defining a limit of axial movement of said second rolling element only in the direction away from the first rolling element, each of said partitions is situated axially intermediate said first and second planes, each partition defining with the adjacent pockets two axially-spaced recesses extending axially and in opposite directions, whereby said cage is elastically deformable in the radial direction and said rolling elements in each of said pairs, as well as rolling elements in adjacent rows, may move relative to each other.

3. In a bearing having an inner race ring and an outer race ring about a common central axis, two circular rows of rolling elements positioned to roll between said rings in raceways in said rings, said two rows defining first and second planes axially spaced along said axis, and a bearing cage insertable axially from one side of said bearing, said cage including holding means for positioning each rolling element of one row adjacent one rolling element of the second row as an axially aligned pair, and for positioning said pairs circumferentially around said raceways, the improvement in combination therewith, wherein said bearing cage comprises an annular, unitary member of a flexible and elastic material having circumferentially spaced U-shaped pockets, each with an axially extending recess which is closed at one end and open at the other end, and a partition between and connecting each two adjacent pockets, and extending from the open end of each pocket a pair of snap-fingers extending generally axially and partially converging, each pocket and associated snap-fingers forming one of said holding means for one of said pairs of rolling elements, each pocket holding a first rolling element of each pair axially fixed in the closed end of the U-shape thereof, with the second rolling element of said pair axially movable in said recess relative to said first rolling element, and said snap-fingers of said pocket defining a limit of axial movement of said second rolling element only in the direction away from the first rolling element, each of said partitions comprises a U-shaped element oriented similarly and between each two adjacent U-shaped pockets, each of said partitions comprising two legs having first ends joined forming the closed end of the U, and opposite ends connected respectively to the open ends of said adjacent pockets with a slot defined between each leg and adjacent pocket, and each partition defines a third slot between said legs thereof, and whereby said cage is elastically deformable in the radial direction and said rolling elements in each of said pairs, as well as rolling elements in adjacent rows, may move relative to each other.

* * * * *

UNITED STATES PATENT AND TRADEMARK OFFICE
CERTIFICATE OF CORRECTION

PATENT NO. : 4,111,501

DATED : September 5, 1978

INVENTOR(S) : Gordon Boyd Johnston et al

It is certified that error appears in the above-identified patent and that said Letters Patent are hereby corrected as shown below:

Column 1, line 20, Change "axially" to --axial--.

Column 2, line 11, Change "mountin" to --mounting--.

Column 2, line 29, Change "party" to --partly--.

Column 2, line 31, Change "preferably" to --preferable--.

Column 2, line 43, Change "where by" to --whereby--.

Column 2, line 52, Change "partitions" to --partition--.

Signed and Sealed this

Twenty-ninth Day of May 1979

[SEAL]

Attest:

RUTH C. MASON
*Attesting Officer*

DONALD W. BANNER
*Commissioner of Patents and Trademarks*